UNITED STATES PATENT OFFICE.

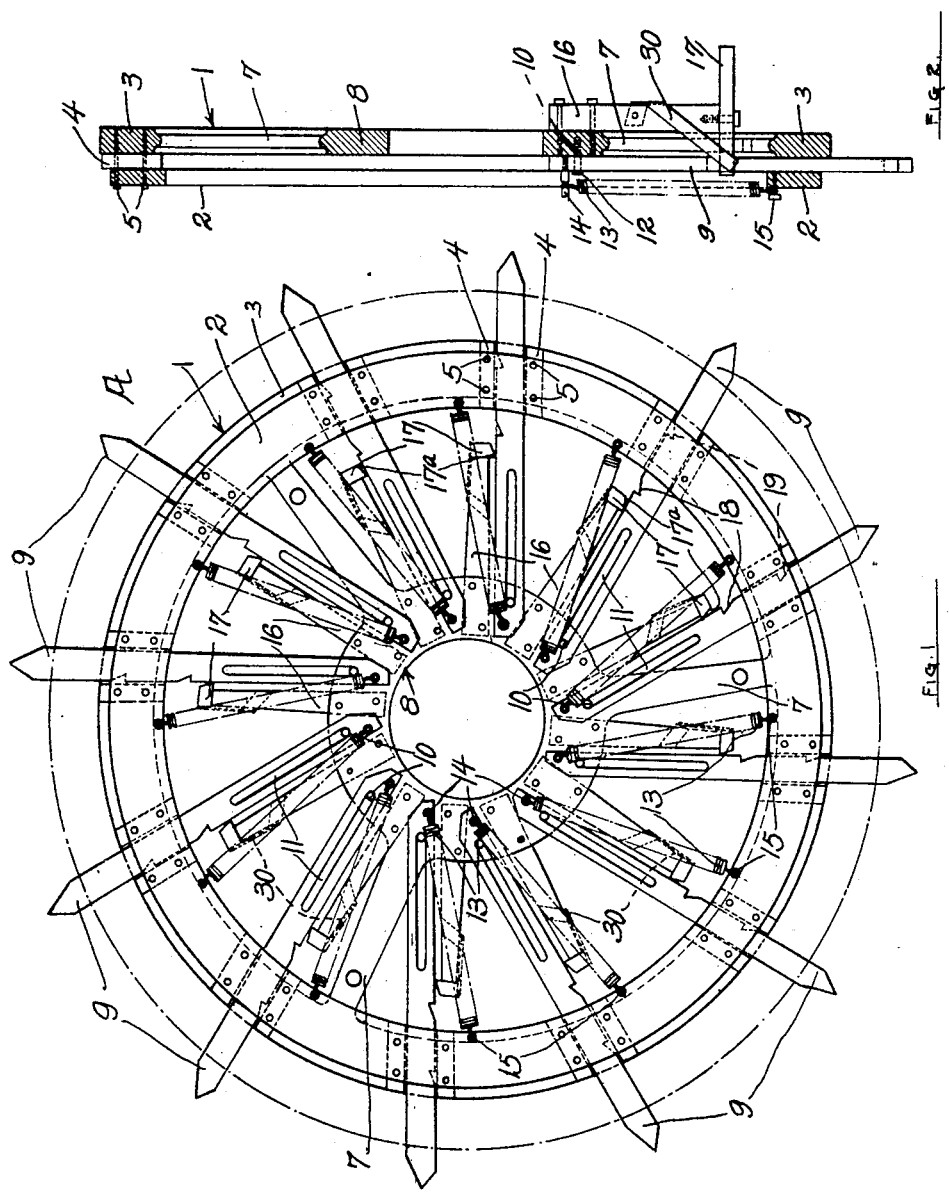

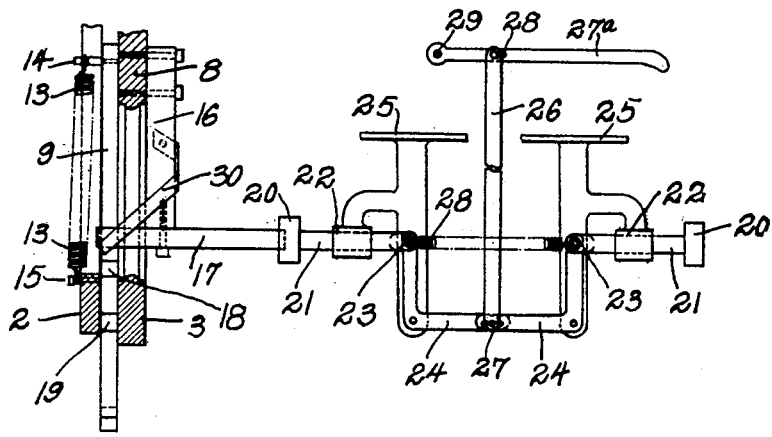
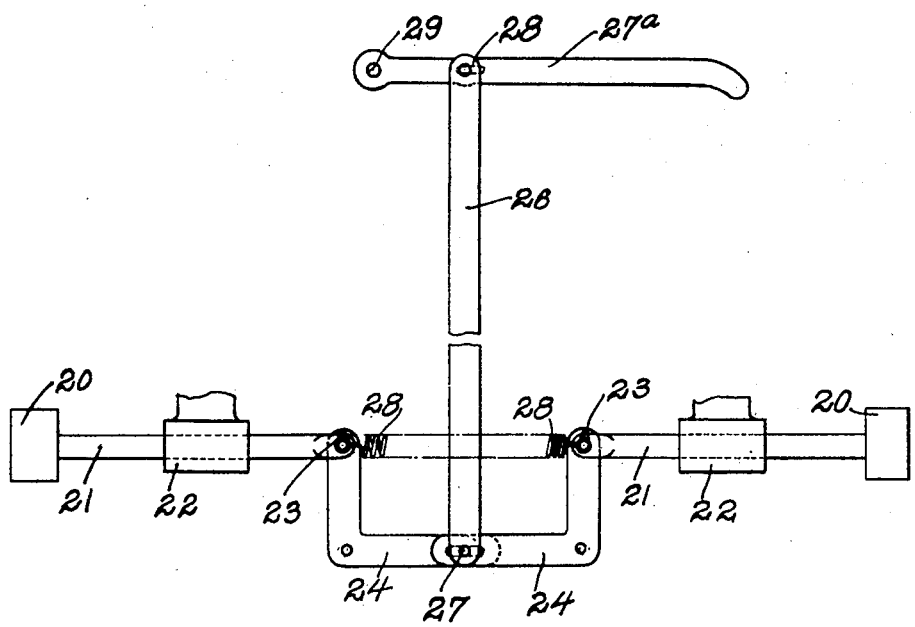

CHARLES N. FRISCO, OF PITTSBURGH, PENNSYLVANIA.

ANTISKID DEVICE.

1,396,567.        Specification of Letters Patent.        Patented Nov. 8, 1921.

Application filed November 6, 1920. Serial No. 422,285.

*To all whom it may concern:*

Be it known that I, CHARLES N. FRISCO, a citizen of the United States, residing at Pittsburgh, in the county of Allegheny and State of Pennsylvania, have invented new and useful Improvements in Antiskid Devices, of which the following is a specification.

This invention relates to anti-skid devices, and more particularly to a device provided with traction surface gripping members and adapted to be secured to the rear or drive wheels of an automobile or similar vehicle.

One of the main objects of the invention is to provide a device of the character stated of simple construction and operation which may be readily applied to an automobile wheel of standard construction. Another object is to provide means for holding the gripping members extended while permitting inward movement thereof, and means for releasably securing the gripping members in retracted position when moved inwardly a predetermined distance. A further object is to provide simple and efficient means for releasing the gripping members while the vehicle is in motion. Further objects will appear from the detailed description.

In the drawings:

Figure 1 is a side view of a device constructed in accordance with my invention as applied.

Fig. 2 is a central sectional view through the device as applied.

Fig. 3 is a front view of the device showing one of the tripping members moved into operative position.

Fig. 4 is a detail of the tripping device.

The device includes an annular frame 1 formed of inner and outer annular members 2 and 3, respectively, which are disposed in concentric relation and are secured together in spaced relation by means of spacing blocks 4 arranged in pairs, bolts 5 being passed through these blocks and members 2 and 3. Member 3 is rigidly connected by arms 7 to an inner ring or frame 8. A plurality of traction gripping bars 9 are slidably connected to this ring by means of pins 10 which project through longitudinally extending slots 11 in bars 9, each of these pins being provided on its outer end with a washer 12. A tension spring 13 is secured at its inner end to the inner end of bar 9, at 14, the outer end of this spring being secured to member 2 at 15. The bars are slidable between the pairs of blocks 4 so as to be movable substantially radially of frame 1, and each bar is held projected by spring 13, this spring permitting inward movement of the bar upon contact of the outer end of the same with the traction surface, but exerting sufficient outward pressure to insure that the outer pointed end of the bar will effectively grip or bite into the traction surface thus preventing slipping or skidding of the wheel. As will be understood, the bars 9 are of such length, that, when projected, they extend beyond the periphery of the tire secured on wheel A.

The inner frame or ring 8 carries a plurality of arms 16 secured at their inner ends to the ring and disposed substantially radially thereof, there being one of these arms positioned closely adjacent to one edge of each of the gripping bars 9. A locking member 17 is pivoted on the outer end of arm 16 for rocking movement toward and away from the adjacent edge of bar 9, which edge is provided with two spaced notches 18 and 19 the inner walls of which are disposed transversely of bar 9. The adjacent lateral face 17ª of locking bar 17 is inclined so as to fit into the notches 18 and 19. When bar 9 is projected the notches are positioned beyond the locking bar, as illustrated. Normally the inward movement of bar 9 will not be sufficient to permit engagement of the locking bar into the inner notch 19. In the event of a flat tire, however, the bar 9 will be forced inwardly so that locking bar 17 will engage into the inner notch 19 thus holding the gripping bars in partially retracted position and preventing cutting or injury to the tire. In this case the wheel travels upon the tire and the partially retracted bars 9 which confine the tire laterally. This prevents excessive radial or outward movement of the deflated tire and eliminates danger of injury to the tire by the gripping bars. When it is not desired to use the gripping bars 9 they may be moved inwardly so as to permit the locking bars 17 to engage into the outer notches 18 thus locking the gripping bars in completely retracted position and preventing engagement of the same with the traction surface.

Each of the locking bars 17 extends inwardly between the spokes of wheel A. A tripping member 20 is provided on the body of the vehicle, and is carried by an arm 21 slidable in a guide 22 and connected at its inner end by pin and slot connections 23 to an angle lever 24 pivoted at its angle on a bracket 25 depending from the automobile body. In practice I provide two tripping members and associated parts, the inner ends of the lower arms of levers 24 being connected to each other and to an operating rod 26 by pin and slot connections 27. The upper ends of levers 24 are connected by a tension spring 28 which serves to normally hold the tripping members 20 in retracted position out of the path of movement of the inner ends of locking bars 17. Rod 26 is connected at its upper end to an operating lever 27, by pin and slot connections 28, this lever being pivoted at one end, at 29, and being placed in any suitable position within the automobile so as to be readily accessible. By raising lever 27 the tripping members 20 are moved outwardly into the path of movement of locking bars 17 which project through the wheels at the opposite sides of the automobile. The inner ends of bars 17 strike the tripping members so as to cause movement of the outer ends of these bars away from the notched edges of gripping bars 9 against the action of leaf springs 30 secured to arms 16 and acting to normally hold the outer ends of the locking bars pressed against the notched edges of the gripping bars 9.

The device may be secured to wheel A in substantially concentric relation thereto, in any suitable or preferred manner, for which purpose arms 7 are provided with openings (Fig. 1) for reception of suitable securing members. Changes in details of construction and arrangement of parts of the invention may be resorted to in practice without departing from the field and scope of the same, and I intend to include all such variations as fall within the scope of the appended claims, in this application in which the preferred form only of my invention is disclosed.

What I claim is:—

1. In a device of the character described, an annular frame adapted to be secured to an automobile wheel, gripping bars slidably mounted on the frame for movement substantially radially thereof and having free inward movement, means for projecting said bars beyond the periphery of the frame, and means for engaging the respective bars when they are forced inwardly of the frame a predetermined distance and for holding them in partially retracted position, said means being also adapted to hold said bars in completely retracted position.

2. In a device of the character described, an annular frame adapted to be secured to an automobile wheel, gripping bars slidable on said frame for movement substantially radially thereof and having free inward movement, means for projecting said bars beyond the periphery of said frame, each of the bars being provided in one edge of its outer portion with spaced notches, and locking members adapted for engagement into said notches and normally pressing against the notched edges of the bars, the inner ends of said notches being disposed substantially transversely of the bars.

3. In a device of the character described, an outer annular frame adapted to be secured to an automobile wheel, an inner annular frame carried by said outer frame, gripping bars slidable through the outer frame substantially radially thereof, pin and slot connections between the inner frame and said bars for positively limiting movement of the latter in either direction, means for holding said bars projected, and means adapted for engagement with the bars when moved inwardly a predetermined distance for holding said bars retracted.

4. In a device of the character described, an annular frame, gripping bars slidable in said frame for movement substantially radially thereof, each of said bars being provided in one edge with spaced notches, locking members pressing against the notched edges of said bars, and means for holding said bars projected beyond the periphery of the frame, said means permitting inward movement of the bars, the locking members being positioned beyond the notches inwardly of the frame when the bars are projected.

5. In a device of the character described, an outer annular frame, an inner frame carried by said outer frame, gripping bars slidably connected to said inner frame and slidable through said outer frame substantially radially thereof, each of said bars being provided in one edge with spaced notches, arms carried by said inner frame, locking bars rockably mounted on said arms, and means for holding said locking bars pressed against the notched edges of the gripping bars.

6. In a device of the character described, an outer annular frame, an inner frame carried by said outer frame, gripping bars slidably connected to said inner frame and slidable through said outer frame substantially radially thereof, each of said bars being provided in one edge with spaced notches, arms carried by said inner frame, locking bars rockably mounted on said arms and projecting inwardly beyond the frame, means for holding said locking bars pressed against the notched edges of the gripping bars, and means movable into the path of movement of the inner ends of the locking bars for moving the latter away from the gripping bars.

In testimony whereof I affix my signature.

CHARLES N. FRISCO.